United States Patent Office 3,712,879
Patented Jan. 23, 1973

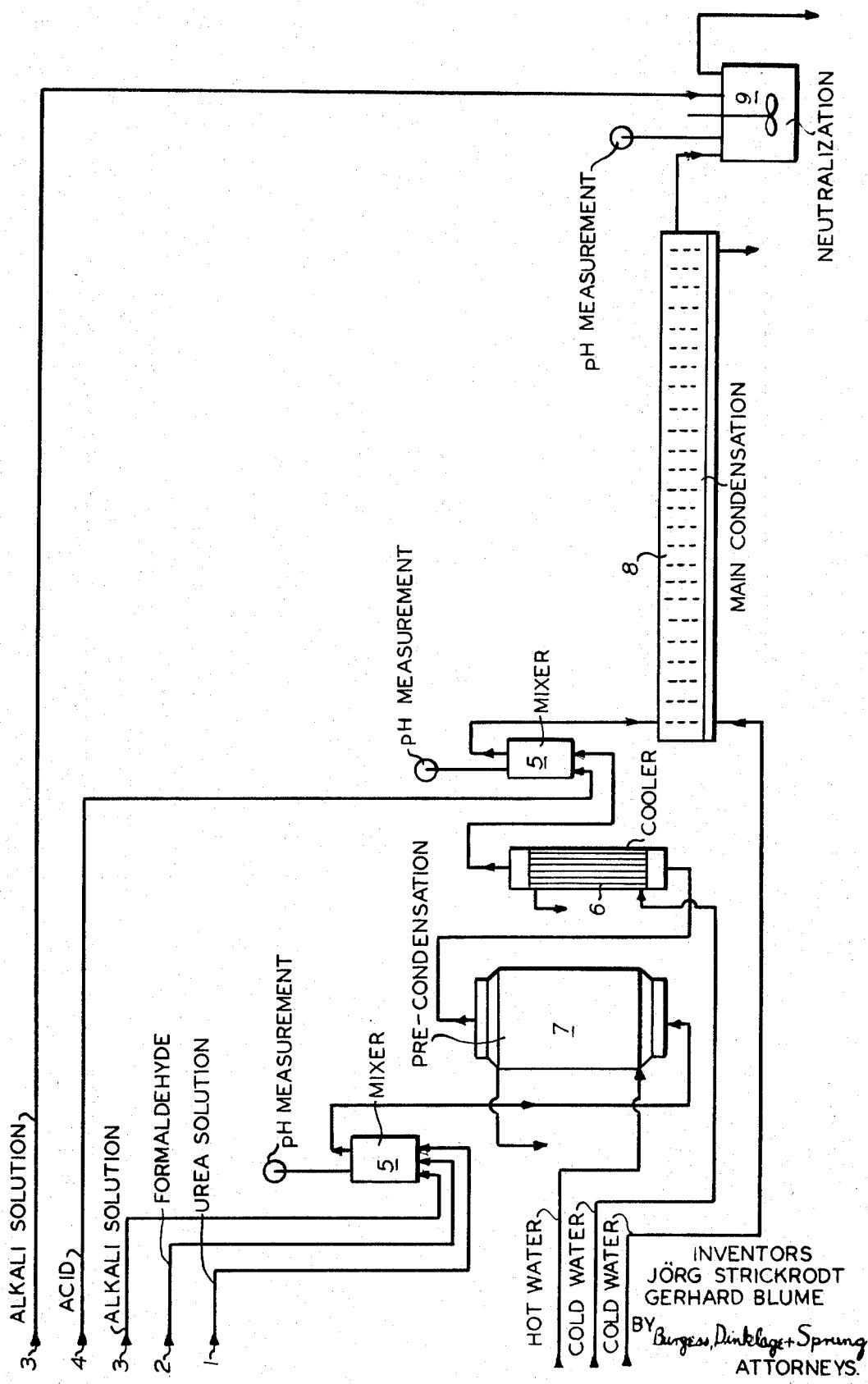

3,712,879
UREA FORMALDEHYDE CONDENSATION PRODUCTS
Jörg Strickrodt, 39 Heinrich-Spoerlstr., 3011 Laatzen, Germany, and Gerhard Blume, 12 Hermann-Korbstr., 334 Wolfenbuttel, Germany
Filed Apr. 3, 1970, Ser. No. 71,284
Claims priority, application Germany, Apr. 4, 1969, P 19 17 569.0
Int. Cl. C08g 9/10
U.S. Cl. 260—69 R    4 Claims

ABSTRACT OF THE DISCLOSURE

Urea formaldehyde condensation products, suitable for use as long lasting fertilizers, are produced in a two stage condensation process, the first stage being a precondensation stage carried out under alkaline conditions, and the second stage being a main condensation, carried out under acid conditions. Intermediate the two stages, the reaction medium is cooled, and the pH is adjusted to that desired for the second stage. The product of the second stage is dried, for example in a spray drier, rapidly and at a low temperature whereby an increase in insoluble nitrogen is avoided.

---

Urea formaldehyde condensation products are gaining importance as fertilizers which deliver nitrogen to plants in a uniform flow over a long period of time, especially in the preparation of unit soils and in container growing. On account of rising labor costs, other applications of the product, which in contrast to other fertilizers can be delivered in a single application for the entire growing season, will no doubt gain importance, since this permits saving the labor costs of the 2nd and 3rd applications of fertilizer.

Urea formaldehyde condensation products also find use as resins for the paint, textile and paper industries. Glue resins, however, constitute the largest group of the technical condensation products, with an annual production of over 200,000 metric tons per year in the Federal Republic of Germany.

Two types of manufacturing processes are known: those in which concentrated solutions are used, and those in which dilute solutions are used.

In the processes using concentrated solutions, solid urea is added to an aqueous formaldehyde solution. The solution is made weakly alkaline and heated, and then adjusted with acid to a pH of about 2 to 4; then a thin coat of it is applied to a heated surface, such as a drum or a belt. The product which at this stage is already solidifying, is neutralized after a short reaction time, dried and crushed.

Advantages of this procedure are low drying cost, short reaction time, and relatively simple apparatus, plus, in some cases, continuous operation. It has, however, certain disadvantages, in that the product quality is hard to control and keep constant, that a delicate neutralization stage is necessary, entailing the formation of a relatively large amount of nitrogen that is insoluble in hot water and can be absorbed by the plant at only a very slow rate.

In the processes using dilute solutions, urea and formaldehyde react in the acid medium at low temperatures. The reaction proceeds slowly. The product, which is in suspension, is then stabilized by neutralization, filtered, granulated and dried. The filtrate contains unreacted urea and formaldehyde, and is recycled.

A disadvantage of this procedure is that the filtration proves difficult, the filtrate has to be recycled, and the drying is rather expensive. The advantages over the other methods lies in the fact that a product of better quality and reproducibility is obtained.

THE INVENTION

The invention makes it possible to combine the advantages of the two prior art procedures and to avoid their disadvantages.

The process according to the invention, for the production of urea formaldehyde condensation products with an alkaline precondensation stage and an acid main condensation stage at elevated temperatures, is characterized in that reactant solutions containing, respectively, 40–80% urea, and 30–40% formaldehyde are combined and subjected to a precondensation and the reaction medium is cooled between the precondensation and the main condensation, and in that during the main condensation the solidifying reaction mixture is thixotropized, and that the drying is performed at low temperatures or over short periods of time. The percentages are on a weight basis. The relative amounts of urea and formaldehyde are those which are conventional for urea formaldehyde condensations.

In the precondensation pH values of 7–9, in the main condensation pH values of 2–4, and in each stage a temperature of 30–70° C. and residence time of 5–60 minutes, is preferably maintained, and the reaction solution is cooled preferably to below 25° C., e.g. to 20–25° C., between the precondensation and the main condensation stages.

It has proven advantageous for the solidifying reaction mass in the main condensation stage to be made and kept thixotropic, e.g. by means of a paddle screw, during the main condensation. Thus, the reaction mass becomes thixotropic in the second stage, and is then maintained, preferably to the conclusion of the reaction, in the "fluid" state by agitation.

It is also advantageous to perform the drying of the ureaform by means of a spray dryer, with a maximum residence time of 5 seconds, e.g. 2–5 seconds, and maximum air input temperatures of 250° C., e.g. 150–250° C. The drying may, however, be performed on a hurdle dryer, a plate dryer, or other similar drying apparatus, at temperatures below 60° C.

Aqueous urea solutions are used having a content of 400 to 800 g. of urea per liter, and the aqueous formaldehyde solution contains about 37% formaldehyde by weight.

The performance of the process of the invention will be described hereinbelow with reference to a flow diagram.

The urea solution 1 and the formaldehyde solution 2 are mixed together in a ratio of 1.2:1 to 2:1, and adjusted with an alkali solution 3 to a pH between 7 and 9. The reaction mixture runs through the so-called precondensation 7 with a residence time of 5 to 60 minutes at temperatures between 30 and 70° C. The precondensation vessel is heated and consists either of a double-walled tube or of a tubular coil. The residence time can be varied by varying the throughput and/or by taking out the reaction solution at different points.

After leaving the precondensation, the reaction solution is cooled to below 25° C. and brought to a pH between 2 and 4 by means of acid 4 in a mixer. The acid reaction mass then passes through the main condensation 8 with residence times between 5 and 60 minutes at temperatures between 30 and 70° C. During the main condensation, the solution that has up to now been clear, rapidly becomes milky in an exothermic reaction, and then becomes more or less solid, depending on the concentration of the starting solutions and the desired degree of condensation. It has been found that this solid reaction mass can be made fluid by the application of a shearing stress, i.e., it has thixotropic properties.

Therefore the main condensation is performed in a screw paddle machine equipped with heating and cooling means making it possible to maintain a uniform temperature throughout the reaction. This system assures that the reaction temperature and the residence time can be precisely controlled. On this account, and due to the precise adjustment of the desired pH, it becomes possible to manufacture continuously a uniform product having the desired degree of condensation.

The ureaform slurry leaving the paddle screw is neutralized with alkali solution in a stirrer vessel 9.

The drying must be fast and gentle, because if even neutralized ureaform is heated for long periods at temperatures above 70° C., the condensation reaction slowly continues. It is desirable, therefore, to perform the drying in a spray dryer at residence times of a few seconds. The end product is then obtained in finely granulated form.

If a slight increase in the percentage of nitrogen that is insoluble in hot water can be permitted, the drying can nevertheless be performed by other conventional methods, e.g., on roller dryers, plate dryers or hurdle dryers.

In general the drying must balance drying time and temperature so that the increase in percentage insoluble in hot water (temperature 50° C.) due to the drying is not more than 5%, preferably not more than 3%.

The process of the invention can be performed continuously with concentrated solutions without causing the formation of an unnecessary amount of hot-water-insoluble nitrogen by a difficultly controllable reaction in the solid state. Particularly important are the following points:

(1) Due to the cooling of the alkaline reaction solution below 25° C. after it leaves the precondensation stage, the exothermic reaction that sets in immediately after the addition of acid and results in solidification is retarded to such an extent that easy adjustment and measurement of the desired pH value between 2 and 4 is assured.

(2) The short drying times of less than 5 seconds, and the use of a spray dryer, prevent any undesired post-condensation of the ureaform, drying air input temperatures up to about 250° C. being permissible. If a drying apparatus requiring a longer residence time is used, the temperature must be reduced accordingly; the temperature of the material must not in any case exceed 60° C.

(3) By exploiting the thixotropy of the solid reaction mass, a precise adjustment of the temperature and residence time is made possible.

The adjustment of the pH in the precondensation stage is performed usually with caustic soda solution if the condensate is to be used only as a nitrogen fertilizer, but it is preferable to perform it with caustic potash solution, since potash is a plant nutrient. In the main condensation the adjustment of the pH is usually performed with sulfuric acid, but if the condensate is to be made into fertilizer it can be performed with phosphoric acid.

When used as fertilizer, the product can be applied to the soil in conventional ways and amounts. The product can be applied in amount of 100–200 kg. per acre.

A fairly large number of reactions take place in the condensation. For the sake of simplicity, however, it can be stated that the methylol compounds form in the precondensation:

$$NH_2CONH_2 + CH_2O \rightarrow HOCH_2NHCONH_2$$

$$NH_2CONH_2 + 2CH_2O \rightarrow HOCH_2NHCONHCH_2OH$$

In the main condensation, the methylol groups further react, yielding water, to form methylene and ether groups:

$$NH_2CONH_2 + HOCH_2NHCONH_2 \rightarrow$$
$$NH_2CONHCH_2NHCONH_2 + H_2O$$

$$NH_2CONHCH_2OH + HOCH_2NHCONH_2 \rightarrow$$
$$NH_2CONHCH_2OCH_2NHCONH_2$$

EXAMPLE

The following are put in:

55 l. of aqueous urea solution per hour (600 g./l.)
25 l. of aqueous formalindehyde solution (36% by weight) per hour
Precondensation: Residence time 20 min.; temperature 40° C.; pH 8.5
Main condensation: Residence time 60 min.; temperature 50° C.; pH 3
Neutralization: pH 7.3

Yield:

Dry substance per hour: 36.4 kg.
Nitrogen content of dry substance: 40.5 wt.- percent
Yield of nitrogen put in: 97%
Nitrogen insoluble in cold water: 57.2 wt.-percent of the total N
Nitrogen insoluble in hot water: 22.1 wt. percent of the total N $$AJ = \frac{57.2 - 22.1}{57.2} \cdot 100 = 61.4$$

What is claimed is:
1. A process for the manufacture of urea formaldehyde condensation products comprising:
(a) mixing a 40% to 80% aqueous solution of urea with a 30% to 40% solution of formaldehyde in a ratio of from about 1.2:1 to 2:1 of the respective solutions;
(b) adjusting the resulting mixture of a pH of about 7 to 9 by the addition of alkali;
(c) heating the mixture at a temperature from about 30° to 70° C. for a residence time of about 5 to 60 minutes whereby precondensation takes place;
(d) cooling the precondensation product below 25° C. and adjusting the mixture to a pH of 2–4 by the addition of acid;
(e) further heating the mixture at a temperature of from about 30° to 70° C. for a residence time of about 5 to 60 minutes whereby condensation takes place resulting in the reaction mixture becoming thixotropic;
(f) agitating the thixotropic reaction mixture to maintain its fluidity; and
(g) drying the urea formaldehyde condensation product.

2. Process according to claim 1, wherein the reaction medium during the main condensation when in thixotropic condition is agitated with a paddle screw.

3. Process according to claim 1, wherein said drying is by spray drying at a residence time of up to 5 seconds with air at a temperature of up to 250° C.

4. Process according to claim 1, the temperature of the product during said drying being maintained under 60° C.

References Cited

UNITED STATES PATENTS

| | | | |
|---|---|---|---|
| 1,817,940 | 8/1931 | Ripper | 260—71 |
| 1,846,853 | 2/1932 | Ellis | 260—71 |
| 1,951,994 | 3/1934 | Rochet | 18—54 |
| 2,004,996 | 6/1935 | Malet et al. | 260—3 |
| 2,140,561 | 12/1938 | Smidth | 260—71 |
| 3,227,543 | 1/1966 | O'Donnell | 71—28 |

HOWARD E. SCHAIN, Primary Examiner

U.S. Cl. X.R.

71—28; 260—71